United States Patent [19]

Kaiser et al.

[11] Patent Number: 4,582,356

[45] Date of Patent: Apr. 15, 1986

[54] PIVOT BEARING FOR SUN VISOR FOR AUTOMOTIVE VEHICLES

[75] Inventors: Klaus-Peter Kaiser, Wermelskirchen; Lothar Viertel, Berus Uberherrn; Gerhard Zweigart, Aidlingen, all of Fed. Rep. of Germany

[73] Assignees: Gebr. Happich GmbH; Daimler-Benz AG, both of Fed. Rep. of Germany

[21] Appl. No.: 681,507

[22] Filed: Dec. 14, 1984

[30] Foreign Application Priority Data

Dec. 17, 1983 [DE] Fed. Rep. of Germany ....... 3345764

[51] Int. Cl.$^4$ .............................................. B60J 3/02
[52] U.S. Cl. ................................... 296/97 K; 248/293
[58] Field of Search ..................... 296/97 K, 97 H; 248/293, 291; 403/165, 365

[56] References Cited

U.S. PATENT DOCUMENTS

| | | | |
|---|---|---|---|
| 3,556,585 | 1/1971 | Binder | 296/97 K |
| 3,910,627 | 10/1975 | Meyer | 296/97 K |
| 4,394,043 | 7/1983 | Moulding | 296/97 K |
| 4,500,131 | 2/1985 | Fleming | 296/97 K |

Primary Examiner—Robert R. Song
Attorney, Agent, or Firm—Ostrolenk, Faber, Gerb & Soffen

[57] ABSTRACT

The disclosure concerns a sun visor including a visor body which is adapted to slide axially along a pivot-bearing housing defined along one longitudinal edge of the sun visor body, whereby the sun visor can be swiveled around that pivot-bearing housing and the sun-visor body can move along the pivot bearing housing. Inside the pivot-bearing housing is disposed one arm of the support shaft for the visor. A sleeve that is around the shaft and inside the pivot-bearing housing is slidable along the shaft and is fixed to the pivot-bearing housing by a spring which acts upon the sleeve through a window in the pivot-bearing housing. A second slide member is positioned toward the free end of the shaft. The end of the pivot-bearing housing supports a fastened on clip, which closes that end of the pivot-bearing housing. The reinforcing insert for the sun-visor body is also supported between flanges formed on the pivot-bearing housing.

22 Claims, 4 Drawing Figures

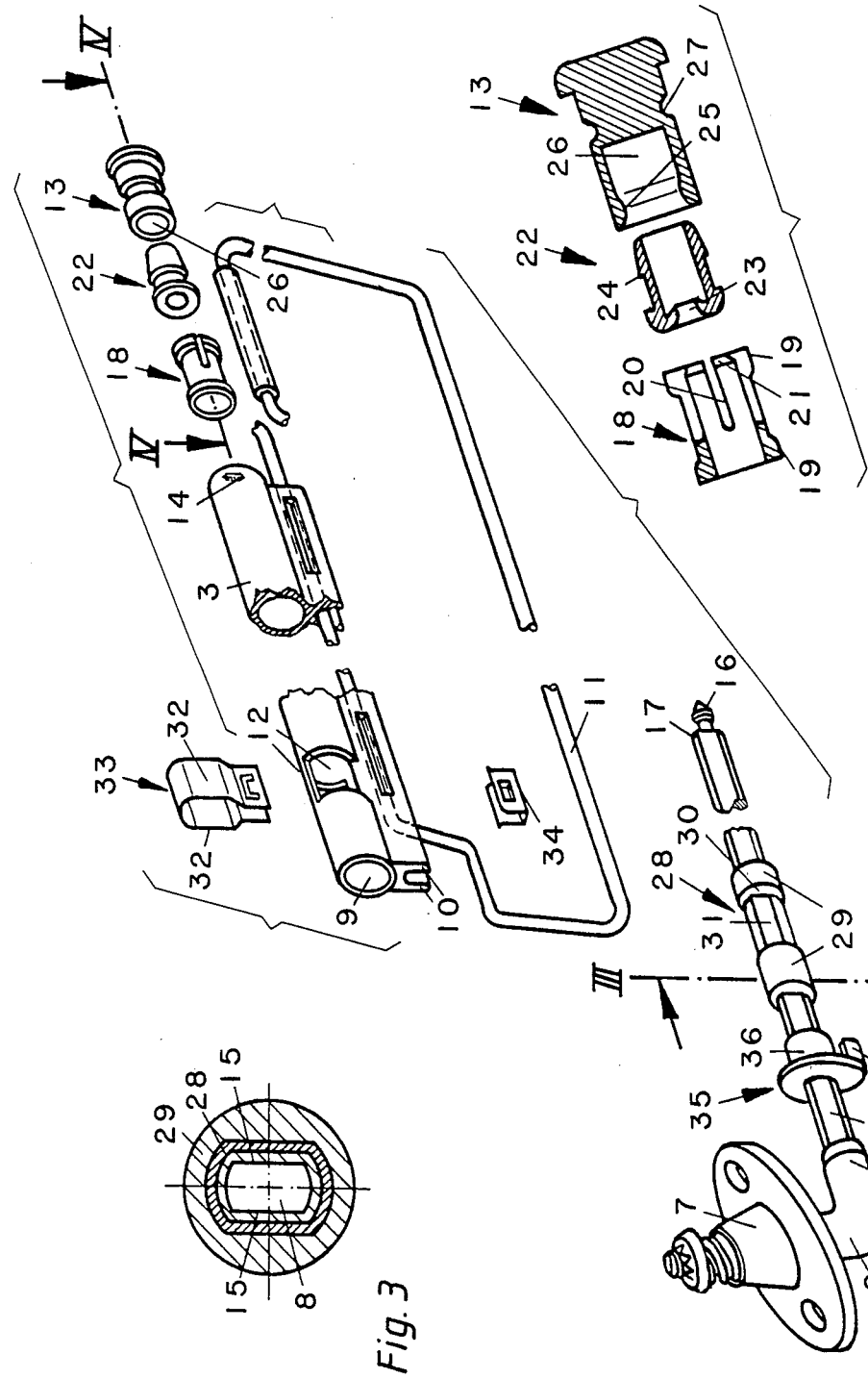

PIVOT BEARING FOR SUN VISOR FOR AUTOMOTIVE VEHICLES

BACKGROUND OF THE INVENTION

The present invention relates to a sun visor for automotive vehicles and more particularly to the pivot-bearing at the visor support shaft. A sun visor comprises a sun-visor body, a pivot-bearing housing incorporated in the body in the region of one longitudinal edge of the body and an approximately L-shaped supporting shaft. The short arm of that supporting shaft is received in a swivel-bearing housing for attachment to the body of the vehicle. The long arm of the shaft has at least one continuous flat along its surface. The long arm of the shaft is received by a sleeve which serves as a slide mounting, and the sleeve is adapted on its inside to the cross sectional profile of the arm. The sleeve is fixed against displacement in a pivot-bearing housing, which housing has at least one window-shaped opening in the reception region of the sleeve. The sun-visor body is mounted for both pivoting around and displacement along the long arm of the supporting shaft.

A sun visor for an automotive vehicle is generally arranged above the windshield. Through the mounting of the long arm of the shaft in the pivot-bearing housing, the visor body can be swung forward in front of the windshield in order to protect against dazzling light coming from in front. The swivel bearing affords the further possibility of swinging the sun-visor body toward a side window of the vehicle where the visor can protect against light entering the vehicle from the side. To better protect the driver and the passenger of the vehicle from incident sun rays and other sources of light, one known sun visor additionally provides for axial displaceability of the sun-visor body on the long arm of the supporting shaft.

A sun visor of the above type is described in German Published Application DE-OS No. 1,630,343 (U.S. Pat. No. 3,556,585). The pivot-bearing housing for that visor comprises a tubular tightening clamp with flanges. That clamp is fastened on a reinforcement insert, which is formed from a wire frame and which stiffens the sun-visor body. The tightening clamp receives at least one supporting sleeve that is formed from a piece of tube into which the long arm of the supporting shaft extends. The tightening clamp has an opening which receives a tab which is cut free from the supporting sleeve and is bent outward. As a result, the tightening clamp cannot move axially with respect to the supporting sleeve but can turn with respect to it. Within the opening of the support sleeve are fastened segment pieces which rest against flats on the long arm of the shaft so that the supporting sleeve is fixed in a non-turnable but axially displaceable manner on the long arm of the shaft. The radial and axial positions of the sun-visor body can be automatically locked by clamping action with this known design. In order to obtain the clamping action, the support sleeve is slit from the opening formed by the bent-out lug up to one end of the sleeve, while above the tightening clamp a further clamp is also arranged, having a set screw by which the slit region of the support sleeve, within which the segment bodies are also fastened, can be narrowed.

SUMMARY OF THE INVENTION

Starting from a sun visor of the above-described type, it is the object of the invention to simplify and decrease the cost of the parts necessary for both swinging the sun-visor body around the long arm of the shaft and for displacing the sun-visor body along the long arm of the shaft in order to achieve a maintenance-free, vibration-free, easily movable mounting for the sun-visor body.

According to the invention, there is a slide bearing which is guided to swivel around the support shaft, without play, in the pivot-bearing housing. It comprises a sleeve that is seated on the long arm of the visor support shaft. The axial end regions of the sleeve are provided with shoulders. In the region between these shoulders, the sleeve has at least one axially extending flat side. An approximately U-shaped spring grips over the pivot-bearing housing in rider fashion. At least one arm of the spring extends through a window-like opening in the pivot-bearing housing and acts on the sleeve in its region between the shoulders. The sleeve preferably has slide extensions at its ends which are guided without play on the long arm of the shaft.

It is of particular advantage that the long arm of the shaft is arranged without play in a sliding seat in the pivot-bearing housing and that the sleeve with the slide extensions arranged on it is also guided without play on a slide seat of the long arm of the shaft. A favorable division of the slide mounting and also vibration-free, easy displaceability of the sun-visor body are thereby obtained. This also avoids canting or deflection of the slide bearing caused by displacement of the sun visor. The sleeve is fixed against rotation on the long arm of the shaft. The sleeve has annular shoulders, and in cooperation with the U-shaped spring which acts on the sleeve, this fixes the axial position of the sleeve with respect to the pivot-bearing housing. On the other hand, the sun-visor body may be held in any selected position of swing. The flat which extends between the annular shoulders of the sleeve further defines an end detent which holds the sun-visor body in its upwardly swung position of non-use, for instance.

The sun-visor body can move back and forth completely without noise in the axial direction of the long arm of the shaft. It can also turn without noise around the long arm of the shaft. This occurs in the preferred embodiment of the invention, wherein the slide body and the slide extension are formed of plastic injection moldings having good sliding characteristics and high resistance to abrasion.

The slide extensions are advantageously cast directly onto the end regions of the sleeve. They also have an opening cross section which corresponds to the cross sectional profile of the long arm of the shaft. Furthermore, the annular shoulders preferably are defined on the sleeve by the slide extension, which also have a tubular shape. These measures serve for simple, inexpensive manufacture, because, in this way, the slide extensions need not be manufactured and mounted separately. Furthermore, this makes machining of the sleeve unnecessary as the sleeve consists of a metallic material and has an inside diameter which is larger than the diameter of the long arm of the shaft.

Generally, one end of the sun-visor body is adjacent the short arm of the supporting shaft and is displaced from its normal position only when this is needed. In order to hold the sun-visor body in the above described normal position and to secure it against unintentional displacement, the long arm of the shaft carries a clip member at its free end region which clip member can engage and disengage in push-button fashion in a recess.

Before the sun-visor body can be pulled out axially, the push-button-like resistance, which need not be particularly great, must be overcome. The push-button engagement preferably produces a clicking noise, at least upon the engagement.

The receiver for the clip member suitably comprises a plug opening that is provided with an inner constriction which is developed into a plug fastened at the end region of the pivot-bearing housing. Furthermore, the long arm of the shaft may at its free end region have a step-shaped shoulder which extends into a mushroom head and which is engaged on the rear by an inwardly directed collar of the slide body. A socket, which is seated fixed against displacement on the mushroom head, rests against the collar-side end of the slide member. That socket forms the clip member. The socket thus fulfills a dual function, in securing the slide member against axial displacement and serving as a clip member. Another development of the invention contemplates developing the slide member integrally with the socket.

In another embodiment of the invention, the pivot-bearing housing has a smooth inner wall which permits a play-free slide seat of the sliding member. The pivot-bearing housing may in this connection suitably comprise a length of round tube or, alternatively, a length of an extruded, profiled member, which surrounds an incorporated tubular member. That housing has two flanges defined on and projecting from its wall. Axially extending regions of a stiffening insert, which is incorporated in the sun-visor body, are fastened between the flanges.

Finally, a guide member having a borehole can be inserted into the end of the pivot-bearing housing adjacent the short arm of the shaft. The diameter of that borehole is adapted to the diameter of the long arm of the shaft and that shaft passes through that borehole.

Other objects and features of the invention are described below with reference to the accompanying drawings.

BRIEF DESCRIPTION OF THE DRAWINGS

FIG. 2 is an exploded view of a sun visor with the cushioned body omitted.

FIG. 3 is a cross-sectional view along the line III—III of FIG. 2.

FIG. 4 is a cross-sectional view along the line IV—IV of FIG. 2.

DESCRIPTION OF A PREFERRED EMBODIMENT

Figure 1:
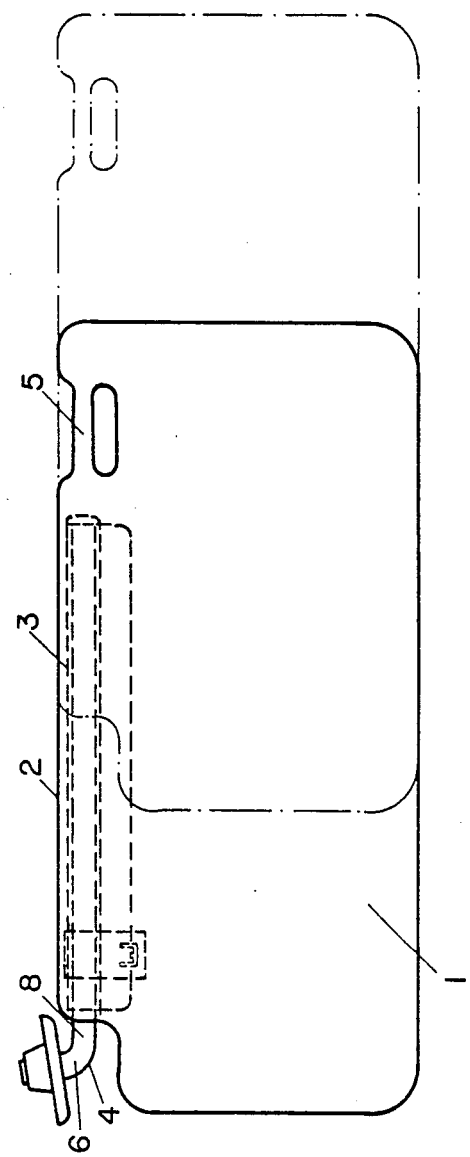
FIG. 1 is an elevational view of a sun visor according to the invention.

The sun visor according to the invention includes a sun-visor body 1 which has an upper longitudinal edge. In the region of that edge, the body 1 carries a hollow pivot-bearing housing 3 which houses a supporting shaft 4. There is a shaft pin 5 for detachable engagement in the outer-support housing on the vehicle, not shown in the drawing. The support shaft 4 is of approximately L shape. The short arm 6 is received by a swivel bearing housing 7 which extends into the vehicle body. The long arm 8 is received in the pivot-bearing housing 3. The sun-visor body 1 is ordinarily arranged on the long arm 8 of the supporting shaft 4 in the position along the shaft 4 that is shown in solid line in FIG. 1. In order that the driver and passenger of a vehicle can be better protected from incident sun rays or other exterior sources of light, the sun-visor body 1 is arranged axially displaceably along the long arm 8 of the shaft 4 for moving to the position indicated in dashed lines in FIG. 1.

The displaceable mounting of the sun-visor body 1 is now explained. The pivot-bearing housing 3 also serves as a slide-bearing housing. The pivot-bearing housing 3 comprises a section of an extruded body formed of metallic material, preferably an aluminum. It has a smooth walled continuous bore 9. Two parallel opposed flanges 10 are developed on and extend continuously along the cylindrical wall of the housing 3. Between the flanges 10 are fastened regions of a reinforcement insert which is formed of a wire frame 11. The insert stiffens the cushioned sun-visor body shown in FIG. 1. In the front end region which is toward the short shaft arm 6, the pivot-bearing housing 3 has two window-shaped openings 12 in its opposite sides. At the rear end of the pivot-bearing housing 3 toward the right in FIGS. 1 and 2, facing the shaft pin 5, the continuous bore 9 is closed by a plug 13. The plug 13 is secured against being pulled out by a constriction formed by at least one bead 14 formed inside the bore 9.

The short shaft arm 6 of the support shaft 4 engages into the swivel-bearing housing 7, which is adapted to be fastened to the body of the vehicle. The shaft arm 6 is fixed in the axial direction but is turnable so that the sun-visor body 1 can be swung from a position located in front of the windshield to a position in front of the side window adjacent the swivel-bearing housing 7. The long shaft arm 8 which is intended for engagement in the bore 9 of the pivot-bearing housing 3 has two diametrically opposite, elongate, continuous flats 15. At the region of its free rear end, the arm 8 has a step-like shoulder 17 and then extends into a mushroom head 16.

In the region of its free end, the long shaft arm 8 carries a slide member 18, which is developed as a plastic injection molding. The slide member has slide ring surfaces 19 at its rear end. The slide member 18 is provided over its rear axial region with slits 20. An inwardly directed collar 21 developed at the rear end of the slide member 18 can be pulled over the mushroom head 16, because of the slits 20, and then the collar 21 of the slide member is to rest against the step-shaped portion 17. The slide member 18 is guided without play in the bore 9.

A socket 22 formed of a plastic injection molding is clipped onto the mushroom head 16. The socket 22 is developed with a forwardly facing inner clip ring 23, which engages behind the mushroom head 16. Furthermore, it includes an outer annular bead 24 developed toward its rear end. The socket 22 serves for axially fixing the slide member 18 on the long shaft arm 8 and at the same time forms a clip member for the push-button-like engagement and disengagement in a receiver 26 which is developed with a mating bead 25 in the plug 13. The plug 13 has an annular groove 27 for receiving the bead 14.

A sleeve 28 is inserted into the bore 9. The sleeve has slide extensions 29 arranged at its ends. These are directly formed as plastic injection moldings on the end regions of the sleeve 28. Each has an opening cross section which corresponds to the cross sectional profile of the long arm 8 of the shaft. These are guided without play in a sliding seat of the long shaft arm 8 (see FIG. 3). The sleeve 28 is provided at its end regions with annular shoulders 30 which are formed and defined by the slide extensions 29. In the region between the shoulders 30, the sleeve 28 has flats 31 which extend parallel to the flats 15 of the long shaft arm 8 (FIG. 3). The sleeve 28 is inserted in the bore 9 together with the slide extension 29 formed on the sleeve.

In the region between the slide extensions 29, the sleeve 28 is engaged by the arm 32 of a U-shaped spring 33 which rides over the pivot-bearing housing 3. Its arms engage the sleeve 28 through the window-like openings 12 in the pivot-bearing housing 3. The free end regions of the spring arms 32 are fastened to each other by a U-shaped securing element 34. The spring 33 serves as an end detent, for securing the sun-visor body in its positions of use and non-use when the arms 32 coincide with the flats 31, and serves over the rest of the region of action, as a friction brake which holds the sun-visor body in any position of swing. Finally, it also secures the sleeve against axial displacement within the pivot-bearing housing 3.

The front closure of the pivot-bearing housing 3 is defined by a guide member 35 formed of a plastic injection molding. The member 35 has a borehole which is adapted to the cross sectional profile of the long shaft arm 8. The guide member 35 has a pin 36 which engages into the bore 9 and has a cam 37 which engages between the flanges 10 on the housing 3 and is held by clamping action.

To assemble the sun visor, the wire frame 11 is fastened to the pivot-bearing housing 3. The socket 22 is pushed into the plug 13, and this combined unit is placed into the rear (right in FIG. 2) end of the continuous bore 9 and is held in place by beads 14. The slide member 18 is next pushed into the front (left in FIG. 2) end of the through bore 9 and this is followed by the sleeve 28. The sleeve 28 is then secured against axial displacement by the placing on of the springs 33, which has been previously greased. The spring 33 is supplemented by placing on it the securing element 34. Finally, the guide member 35 is inserted. The visor body cushioning (FIG. 1) and possibly a foil wrapping over the cushioning are placed in the customary manner around the unit which has thus been formed. Next, the support shaft is mounted. Its long arm is passed through the guide member 35, through the sleeve 28 with slide extensions 29 and through the slide member 18. By means of a slight blow, the mushroom head 16 is furthermore engaged into the socket 22. Assembly is finished.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A sun visor for automotive vehicles, comprising:
a sun-visor body having a first longitudinal edge and including a hollow pivot-bearing housing at the first edge, an opening defined in and along the pivot-bearing housing;
a generally L-shaped bearing support shaft having one arm for being received at the body of a vehicle; the support shaft having a second arm for being received in the pivot-bearing housing;
a slide bearing for the visor body and being disposed on the second arm of the support shaft and being movable therealong;
fixing means for fixing the slide bearing against displacement with respect to the pivot-bearing housing; the pivot-bearing housing having a window opening in it providing access to the slide bearing within the pivot-bearing housing, and the fixing means comprising a spring on the pivot-bearing housing, extending through the window opening and bearing against the slide bearing for fixing the slide bearing against shifting along the second arm with respect to the pivot-bearing housing.

2. The sun visor of claim 1, wherein the slide bearing includes a sleeve through which the second arm of the shaft extends and on which arm the slide bearing can slide axially.

3. The sun visor of claim 2, wherein the second arm of the shaft has a flat defined on it, and the sleeve of the slide bearing is internally profiled to ride on the flat to prevent rotation of the sleeve around the shaft.

4. The sun visor of claim 2, further comprising means for permitting the slide bearing sleeve to move axially of the second arm while prohibiting rotation of the sleeve around the second arm.

5. The sun visor of claim 4, wherein the sleeve includes spaced apart shoulders between which the spring engages the sleeve.

6. The sun visor of claim 2, wherein the sleeve includes a flat defined on it and positioned such that the spring will contact the flat on the slide bearing for inhibiting rotation of the slide bearing when the spring is resting against the flat.

7. The sun visor of claim 2, wherein the spring is U-shaped and rides on the pivot-bearing housing, and the spring includes one leg thereof which bears against the slide bearing.

8. The sun visor of claim 2, wherein the second arm has an end that is away from the first arm of the support shaft; a slide member fixed to the end of the second arm and the slide member being guided without play in the pivot-bearing housing.

9. The sun visor of claim 4, wherein the sleeve has opposite ends and includes slide extensions on the opposite ends, the slide extensions being guided without play on the second arm of the shaft.

10. The sun visor of claim 8, further comprising means for permitting the slide bearing sleeve to move axially for the second arm while prohibiting rotation of the sleeve around the second arm;
the slide member and the slide extensions both comprising plastic injection moldings having good sliding properties and high resistance to abrasion.

11. The sun visor of claim 10, wherein the slide extensions are injection molded integrally on the ends of the sleeve; the slide extensions having cross-sectional openings therethrough corresponding to the cross-sectional profile of the second arm of the shaft.

12. The sun visor of claim 4, wherein the sleeve is comprised of metallic material; the sleeve having an inside diameter which is greater than the diameter of the second arm of the shaft on which the sleeve rides.

13. The sun visor of claim 8, wherein the sleeve shoulders are defined as slide extensions of the sleeve, and the slide extensions have a tubular shape.

14. The sun visor of claim 8, wherein the second arm of the shaft has at its end a clip member; a receiver separate from the clip member and adapted for engagement on the clip member in a push-button-like fashion.

15. The sun visor of claim 2, wherein the sleeve shoulders are defined as slide extensions of the sleeve, and the slide extensions have a tubular shape.

16. The sun visor of claim 14, wherein the receiver includes a plug opening, with an inner constriction defined in it, whereby the receiver comprises a plug; the receiver plug being removably fastened to the end of the pivot-bearing housing.

17. The sun visor of claim 16, wherein the second arm of the shaft includes a step-shaped shoulder defined at its free end; a mushroom head defined at the free end of the second arm beyond the step-shaped shoulder; the slide member having an inwardly directed collar thereon for gripping the mushroom head of the second arm of the shaft; a separate clip member having a socket therein which is fixed against translation on the mushroom head and on the side of the slide member facing toward the collar on the free end of the shaft.

18. The sun visor of claim 17, wherein the slide member is integral with the socket clip member.

19. The sun visor of claim 8, wherein the pivot-bearing housing has an inner wall surrounding the slide member, and the inner wall is smooth, which permits sliding of the slide member with respect to the pivot-bearing housing along the second arm of the shaft.

20. The sun visor of claim 2, wherein the pivot-bearing housing comprises a round tube.

21. The sun visor of claim 20, wherein the pivot-bearing housing is a profiled member comprising an incorporated tubular member and further comprising two flanges seated next to each other and spaced slightly apart and extending along the exterior of the tubular member; the sun visor further comprising a stiffening insert for stiffening the body of the sun visor; the insert being incorporated in the sun-visor body and being fastened between the flanges of the profiled member.

22. The sun visor of claim 20, further comprising a guide member having a bore therethrough riding over the second arm of the shaft and being inserted into that end of the pivot-bearing housing which faces toward the first arm of the shaft, the diameter of the guide member being approximately the diameter of the second arm of the shaft.

* * * * *